(12) United States Patent
Shaw et al.

(10) Patent No.: US 7,677,309 B2
(45) Date of Patent: Mar. 16, 2010

(54) METHOD FOR INCREASED OIL RECOVERY FROM AN OIL FIELD

(75) Inventors: Gareth David Huntley Shaw, Cape Town (ZA); Ola Olsvik, Hundhamaren (NO); Erling Rytter, Trondheim (NO); Jostein Sogge, Stjørdal (NO); Jan Age Stensen, Trondheim (NO)

(73) Assignees: Statoil ASA, Stavanger (NO); Petrosa (The Petroleum Oil & Gas Corporation of SA (Pty) Ltd), Mossel Bay (ZA)

( * ) Notice: Subject to any disclaimer, the term of this patent is extended or adjusted under 35 U.S.C. 154(b) by 0 days.

(21) Appl. No.: 12/122,181

(22) Filed: May 16, 2008

(65) Prior Publication Data
US 2008/0283254 A1    Nov. 20, 2008

Related U.S. Application Data

(63) Continuation of application No. 10/538,417, filed as application No. PCT/NO02/000477 on Dec. 13, 2002.

(51) Int. Cl.
E21B 43/00    (2006.01)

(52) U.S. Cl. ........................... 166/266; 166/90.1

(58) Field of Classification Search ......... 166/266–268, 166/90.1, 75.15
See application file for complete search history.

(56) References Cited

U.S. PATENT DOCUMENTS

| 5,388,645 | A | 2/1995 | Puri et al. |
| 6,119,778 | A | 9/2000 | Seidle et al. |
| 6,306,917 | B1 | 10/2001 | Bohn et al. |
| 7,100,692 | B2 | 9/2006 | Parsley et al. |
| 2006/0231455 | A1 | 10/2006 | Olsvik et al. |

FOREIGN PATENT DOCUMENTS

| CA | 1250863 A | 3/1989 |
| EP | 1004746 A1 | 5/2000 |
| WO | WO 97/12118 A1 | 4/1997 |
| WO | WO 01/42175 A1 | 6/2001 |

*Primary Examiner*—Jennifer H Gay
*Assistant Examiner*—Nicole A Coy
(74) *Attorney, Agent, or Firm*—K&L Gates LLP

(57) ABSTRACT

A method for increasing oil recovery from an oil reservoir in which method surplus gas streams from a plant for synthesis of higher hydrocarbons from natural gas is injected into the reservoir, is described. The surplus streams from the plant is the tailgas from the synthesis and optionally nitrogen from an air separation unit which delivers oxygen or oxygen enriched air to the plant for synthesis of higher hydrocarbons.

10 Claims, 3 Drawing Sheets

METHOD FOR INCREASED OIL RECOVERY FROM AN OIL FIELD

CROSS REFERENCE TO RELATED APPLICATIONS

This application is a continuation of application Ser. No. 10/538,417 filed Nov. 10, 2005 which is incorporated herein by reference, and which is a U.S. national stage application of International Application No. PCT/NO2002/000477, filed 13 Dec. 2002, having an International Publication Number of WO 2004/055322 A1 and an International Publication Date of 1 Jul. 2004.

THE FIELD OF THE INVENTION

The present invention relates to the use of natural gas and air in the development of industry and oil fields. In particular, the invention relates to a method and a plant for integrated production of synthesis gas and air gas for synthesis of higher hydrocarbons and utilizing surplus streams for injection into an oil reservoir.

THE BACKGROUND OF THE INVENTION

Injection of various gases into an oil reservoir in order to enhance the oil recovery from the reservoir, and to stabilize it, has for a long time been known and used. Gases such as $CO_2$, $N_2$ and natural gas will reduce the surface tension between gas and oil, and thus contribute to both increased recovery and stabilization of the reservoir.

During enhanced oil recovery operations, a number of techniques are applied that depend on the nature of the specific field and wells, their maturity, seasonal variations etc. The most common approaches are secondary oil depletion using water flooding or gas injection. Further alternatives, often referred to as tertiary depletion, include injection of gas after water, alternating gas and water injection (WAG), and simultaneous water and gas injection (SWAG). Thermal treatment by injection of steam or in situ combustion is also possible. By gas we here mean all viable options like methane, other hydrocarbons, nitrogen, air, flue gas, carbon dioxide or mixtures of any of these gases.

Natural gas as such may be injected into fields where the gas does not have a net value that exceeds the excess profits of increasing the oil recovery in the field. An oil field contains hydrocarbon liquids (oil), associated gas and water.

$N_2$ maybe produced together with 02 in a so-called air separation unit (ASU). In an oil field, such an air separation unit will normally produce N2 with a purity of >99.9% and oxygen-enriched air. There is little or no need for this oxygen-enriched air on the oil field, and all or most of this is therefore released.

Separation of air into an "oxygen-depleted stream" and an "oxygen-enriched stream" is 35 described in U.S. Pat. Nos. 5,388,645 and 6,119,778. The oxygen-depleted stream is used for injection into a "solid carbonaceous formation" for improved recovery of methane, and at least a part of the oxygen-enriched stream is used for reaction with a reactant stream containing at least one oxidizable reactant. Examples of processes are steelmaking operations, production of non-ferrous metals, chemical oxidation processes and production of synthesis gas for Fischer-Tropsch synthesis of higher hydrocarbons from natural gas.

The oxygen-depleted stream has a nitrogen to oxygen volume ratio of 9:1 to 99:1. A too low ratio may lead to the formation of an explosive gas. An oxygen-depleted gas, e.g. nitrogen, for injection into an oil field to enhance the production preferably includes less than 0.1% oxygen.

No other integration between the processes using the oxygen-depleted and oxygen-enriched streams is mentioned in U.S. Pat. Nos. 5,388,645 or 6,119,778.

Natural gas may also be used as feed for a number of processes such as the production of methanol, di-methyl ether or other oxygenated hydrocarbons, and/or synthetic fuel/propellant. This can take place in accordance with known processes such as described in PCT/N000/00404.

The oxygen needed for production of synthesis gas ("syngas") in plants for synthesis of 20 methanol and other oxygenated hydrocarbons and/or synthetic fuel may be supplied as straight air containing about 21% $O_2$, oxygenated air containing more than 21% $O_2$ to pure oxygen of almost 100%.

Syngas is a mixture of CO, $CO_2$, $H_2$, $N_2$ and water vapour and some non reacted natural gas. The syngas is used in various synthesis reactions, such as for the production of methanol and other oxygenated hydrocarbons, heavier hydrocarbons and ammonia. The $N_2$ in the syngas enters the system as a part of the natural gas and/or air or oxygenated air. Nitrogen is inert both in the syngas production and in the different following synthesis reactions and finds its way into the tailgas stream which is then passed through a tailgas combustion unit to produce power. It is often preferred to use oxygenated air or pure oxygen for the production of syngas to reduce the total gas volume of the gas circulating in the plant.

The oxygen produced in an air separation unit in such a plant is typically >95% pure oxygen, while the nitrogen often will be relatively impure that is not suitable for other applications, and is therefore released to the atmosphere.

A process for preparation of higher hydrocarbons and for enhancing the production of crude oil from an underground formation is described in Canadian Patent No. 1,250,863. The off-gas from the synthesis plant is oxidized into mainly $CO_2$ and $H_2O$ before it is injected into the underground formation. Preferably, the presence of nitrogen is avoided by using oxygen from an air separation unit for all oxygen-demanding processes.

A SUMMARY OF THE INVENTION

According to a first aspect of the present invention, there is provided a method for increasing oil recovery from an oil reservoir in which method gas is injected into the reservoir, comprising the steps of:

separating air into an oxygen-rich fraction and a nitrogen-rich fraction;

providing a natural gas stream and leading the natural gas stream and at least a part of the oxygen-rich fraction to a reformer for conversion to synthesis gas mainly comprising $H_2$, CO, $CO_2$ and lower amounts of non-converted methane, water vapor and nitrogen;

forming higher hydrocarbons from the synthesis gas in a synthesis unit;

withdrawing raw synthesis products and a waste gas from the synthesis unit; and injecting the nitrogen rich fraction and at least a part of the waste gas into the oil reservoir to increase the oil recovery from the reservoir.

Preferably steam or water generated during the syngas production and/or synthesis is injected into the reservoir.

According to a second aspect of the present invention, there is provided a plant for providing gas for down-hole injection for pressure support in an oil reservoir for recovery of hydrocarbons and production of oxygenated hydrocarbons or higher hydrocarbons from natural gas, comprising:

an air separation unit for production of an oxygen-rich fraction for supply to processes that require oxygen, and a nitrogen-rich fraction for injection;

a reformer for conversion of a mixture of natural gas, water and oxygen or oxygen enriched air from the air separation unit into a synthesis gas comprising mainly $H_2$, CO, $CO_2$ and small amounts of methane in addition to any inert gas, such as nitrogen;

a synthesis unit for conversion of the synthesis gas for synthesis of higher hydrocarbons;

means for injecting gas into the reservoir;

means for transferring nitrogen from the air separation unit to the means for injecting gas; and means for transferring at least a part of a waste gas from the synthesis unit to the means for injecting gas.

Preferably the plant additionally comprises a tail gas treatment unit for removing CO by a shift reaction and separation of hydrogen from the remaining tail gas.

Further, the plant preferably comprises means for transferring the remaining tail gas from the tail gas treatment unit to the means for injecting gas.

The synthesis unit preferably comprises one or more once-through Fischer-Tropsch units for synthesis of higher hydrocarbons.

Additionally the plant preferably comprises means for introducing all or parts of the separated hydrogen from the tail gas treatment unit into the Fischer Tropsch loop to adjust the $H_2/CO$ ratio to a desired level.

By combining a plant for production of high-purity nitrogen with the production of oxygen, the co-producing air separation unit only becomes 10-20% more expensive than an air separation unit that only produces high-purity nitrogen for injection into oil fields. This allows significant cost savings, both for production of synthesis products such as methanol and synthetic fuel, and for oil field injection.

Additionally, several of these EOR injection fluids or gases are or can be produced as part of the operation of a GTL plant. The possibilities are at least Nitrogen from the ASU unit, as described in detail in this application.

Flue gas, particularly if traditional SMR (steam methane reforming) fired heaters and gas turbines are used in whole or partly.

Water produced by the Fischer-Tropsch process. Steam produced by the FT-process.

Light hydrocarbons, including methane, produced by the FT-process.

According to a third aspect of the present invention, there is provided a method for increasing oil recovery from an oil reservoir in which method gas is injected into the reservoir, comprising the steps of Compressing pure air, providing a natural gas stream and leading the natural gas stream and at least a part of the air stream to a reformer for conversion to synthesis gas mainly comprising $N_2$, $H_2$, CO, $CO_2$ and lower amounts of non-converted methane, water vapour, formation of higher hydrocarbons from the synthesis gas in a synthesis unit, withdrawing raw synthesis products and a nitrogen rich waste gas from the synthesis unit, and injecting the nitrogen rich waste gas into the oil reservoir to increase the oil recovery from the reservoir, Preferably steam or water generated during the syngas production and/or synthesis is injected into the reservoir.

According to a fourth aspect of the present invention, there is provided a plant for providing gas for down-hole injection for pressure support in an oil reservoir for recovery of hydrocarbons and production of oxygenated hydrocarbons or higher hydrocarbons from natural gas, comprising:

an air compression unit for production of compressed air for supply to processes that require a pure air stream;

a reformer for conversion of a mixture of natural gas, water and air from the air compression unit into a synthesis gas comprising mainly $N_2, H_2$, CO, $CO_2$ and small amounts of methane;

a once-through synthesis unit for conversion of the synthesis gas for synthesis of higher hydrocarbons;

means for injecting gas into the reservoir; and means for transferring at least a part of a nitrogen rich waste gas from the synthesis unit to the means for injecting gas.

Preferably the plant additionally comprises a tail gas treatment unit for removing CO by a shift reaction and separation of hydrogen from the remaining tail gas.

Further, the plant preferably comprises means for transferring the remaining tail gas from the tail gas treatment unit to the means for injecting gas.

The synthesis unit preferably comprises one or more once-through Fischer-Tropsch units for synthesis of higher hydrocarbons.

Additionally the plant preferably comprises means for introducing all or parts of the separated hydrogen from the tail gas treatment unit into the Fischer Tropsch loop to adjust the $H_2/CO$ ratio to a desired level.

More detailed utilization of some of these possibilities can be illustrated by the examples below. It should be recognized that there are multiple ways to combine the described injection gases, both by mixing with natural gas, and by applying intermittent operation, also using water part of the time.

A BRIEF DESCRIPTION OF THE FIGURES

DETAILED DESCRIPTION OF THE INVENTION

Figure 1:
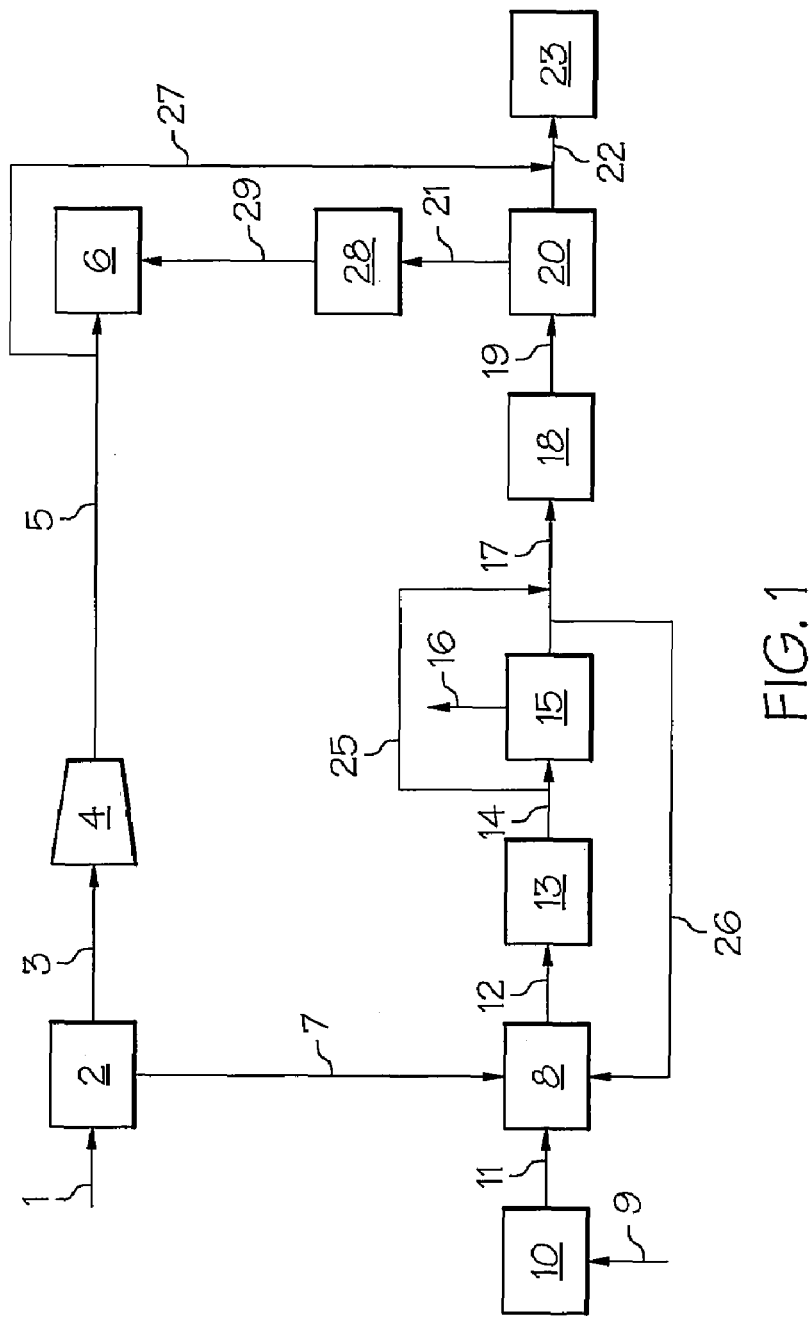
FIG. 1 shows a schematic diagram of a general embodiment of the present invention.

FIG. 1 is a schematic diagram showing the principal features of a general embodiment of the present invention. Air is drawn in through an air intake 1 to an air separation unit 2, where it is separated into the main components nitrogen and oxygen. The air separation unit differs from traditional air separation units used for production of oxygen to reformers or for production of nitrogen for injection into an oil well, in that it produces both nitrogen and oxygen with a high purity. The produced nitrogen typically has a purity of >99.9%, while the oxygen typically has a purity of 98-99.5%.

The nitrogen is passed through line 3 to a compressor 4 where it is compressed to the desired pressure, e.g. of the order of 50-400 bar. From the compressor 4, the compressed nitrogen stream is passed through a line 5 to a plant 6 for injection of gas into a field, a so-called EOR unit ("Enhanced Oil Recovery").

The oxygen is passed through a line 7 to a synthesis gas production emit, a so-called reformer 8.

Natural gas is fed to the plant through a gas inlet 9. Prior to the natural gas being sent into line 11 to the reformer for production of synthesis gas, it is treated in a pre-treatment unit 10 in which sulphur compounds are removed in a conventional manner. Steam is then saturated into the gas and/or added directly to the gas. The saturation may take place by means of a so-called saturator. Often, the gas is also treated in a so-called pre-reformer in order to convert all heavier hydrocarbons (C2+) to methane, CO and $CO_2$ before the gas is sent into the reformer 8.

In the reformer, the following are the main chemical reactions to take place during the production of synthesis gas:
1. $CH_4 + H_2O = CO + 3H_2$, steam reforming
2. $CH_4 + 3/2\ O_2 = CO + 2H_2O$, partial oxidation
3. $CO + H_2O = CO_2 + H_2$, shift reaction Reaction 1 in the reforming reactor is highly endothermic, and the heat required for the reaction may either be added through external heating, such as in a steam: reformer, or through a combination with internal partial oxidation according to reaction 2, such as in an autothermal reformer. In a steam reformer (SR), natural gas. (NG) is converted in a tubular reactor at a high temperature and relatively low pressure. A conventional steam reformer consists of a large number of reactor tubes in a combustion chamber. Conventional steam reformers are operated in a pressure range from approximately 15 to 40 bar. The outlet temperature for such a reformer can get up to 950° C. The heat required to drive the reaction is added by means of external heating in the combustion chamber in which the reformer tubes are installed.

The reformer may be top, bottom or terrace fired. The heat can also be transferred to the reaction by means of convective heat as in a heat exchanger reactor. The ratio between steam and carbon in the feed gas is from 1.6 to 4. The composition of the synthesis gas may as an example be expressed by the stoichiometric number $SN(H_2 - CO_2)/(CO_2 + CO)$. The stoichiometric number for the product stream from the steam reformer is approximately 3 when the natural gas contains pure methane. A typical synthesis gas from a conventional steam reformer contains approximately 3 volume % methane on dry gas basis.

In an autothermal reformer (ATR), the synthesis gas production mainly takes place through reactions 1 and 2, such that the heat required for reaction 1 is generated internally via reaction 2. In an ATR, natural gas (methane) is led into a combustion chamber together with an oxygen-containing gas such as air. The temperature of the combustion chamber can get up to over 2000° C. After the combustion, the reactions are brought to an equilibrium across a catalyst before the gases leave the reformer at a temperature of approximately 1000° C. The stoichiometric number, SN, for the product stream from an ATR is approximately 1.6-1.8. The pressure may typically be around 30-40 bar, but a significantly higher pressure has also been proposed, such as in the range of 40-120 bar. The steam/carbon ratio may vary with the intended application, from 0.2 to 2.5.

An alternative autothermal reformer makes use of a concept called partial oxidation (PDX). Such a reformer does not contain any catalyst for accelerating the reactions, and will therefore generally have a higher outlet temperature than an ATR.

Natural gas reforming may also take place through combined reforming (CR), where the reformer section consists of a SR and an ATR. A combination of SR and ATR allows the composition exiting the reformer section to be adjusted by regulating the duties of the two reformers. SR will in CR be operated under milder conditions than in the case of normal SR, i.e. at a lower temperature. This results in a higher methane slippage in the outlet gas from the reformer. This methane content is converted to synthesis gas in the subsequent ATR The Ratio between steam and carbon in the gas feed will, for such a reformer, lie in the range 1.2 to 2.4, with a stoichiometric number, SN, of around 2 or slightly above 2.

The desired composition of the synthesis gas will depend on the process conditions. The desired stoichiometric number for production of synthetic fuel often lies in the range 1.6 to 1.9, as a higher stoichiometric number gives a greater yield of lighter hydrocarbons than desirable.

After reforming, the synthesis gas is cooled by being heal exchanged with water to give steam. Upon further cooling, water is condensed and separated from the synthesis gas before the synthesis gas is sent via a line 12 to a synthesis unit 15.

The synthesis unit 15 may for instance be a synthesis unit for production of synthetic fuel (heavier hydrocarbons), comprising a so-called Fischer-Tropsch reactor (F-T reactor).

The reaction may be described using the following reaction equation:

$$nCO + 2nH_2 = [-CH_2-]_n + nH_2O$$

The reaction is highly exothermic. The Fischer-Tropsch synthesis is well known and is described e.g. in PCT/N000/00404.

The process normally includes internal recycling of non-reacted synthesis gas in order to increase the carbon-efficiency of the process.

The product from the synthesis unit 15 is extracted through a product outlet 16 for further treatment. Non reacted synthesis gas and inert gas that collects in the loop can be removed from the-synthesis unit 15 through line 17. This gas will in the following description be denoted the waste gas from the synthesis unit. The amount and composition of the waste gas from the synthesis unit depends on the released methane in the synthesis gas from the reformer section, as well as selected process parameters in the synthesis unit.

If $CO_2$ is required for injection into the oil well in addition to nitrogen, or if environmental conditions require the emission of $CO_2$ from the plant to be reduced, the waste gas from the synthesis unit may alternatively be further passed to a CO shift converter 18 in which CO is converted according to the following reaction equation:

$$CO + H_2O \rightarrow CO_2 + H_2$$

in order to make it easier to separate out the carbon content of the gas.

When the synthesis unit 15 is a synthesis unit for production of synthetic fuel, synfuel, it may also be desirable to recycle non-reacted synthesis gas from line 17 to the reformer via line 26.

By recycling via line 26, the $H_2/CO$ ratio of the synthesis gas may be adjusted to the desired value, i.e. around 2.0 or just below 2.0, and the CO yield and thereby also synthetic fuel yield may be increased by the high content of $CO_2$ in the recycling gas suppressing further conversion of CO to $CO_2$ through the shift reaction in the autothermal reformer. Here, it should be noted that $CO_2$ is to be considered as an inert gas in the F-T synthesis.

If the reformer produces more synthesis gas than can be converted in the synthesis unit, some of the synthesis gas may be led from a line 14 running between the $CO_2$ recovery unit 13 and the synthesis unit 15, and around the synthesis unit in a bypass line 25. This may also be desirable if there is a wish to produce more heat or power in a furnace or gas turbine 23.

In certain cases it may also be desirable to remove a volume of nitrogen from line 5 out into a line 27 and bring this together with the gas in line 22, which is led to a gas turbine in unit 23 in order to control the combustion and generation of heat in this.

The units 13 and 20 for separating $CO_2$ from the remainder of the gas are known units. By the reformer 3 being supplied with pure oxygen instead of air, the volume of gas to be treated becomes considerably smaller. The separation in the units 13, 20 may take place in a known manner by means of semi-permeable membranes or by absorption with subsequent desorption, e.g. in an amine solution.

The air separation unit 2 is preferably: a plant based on cryogenic distillation, however it is also possible to use plants based on pressure swing adsorption or membranes or a combination of these technologies.

Figure 2:
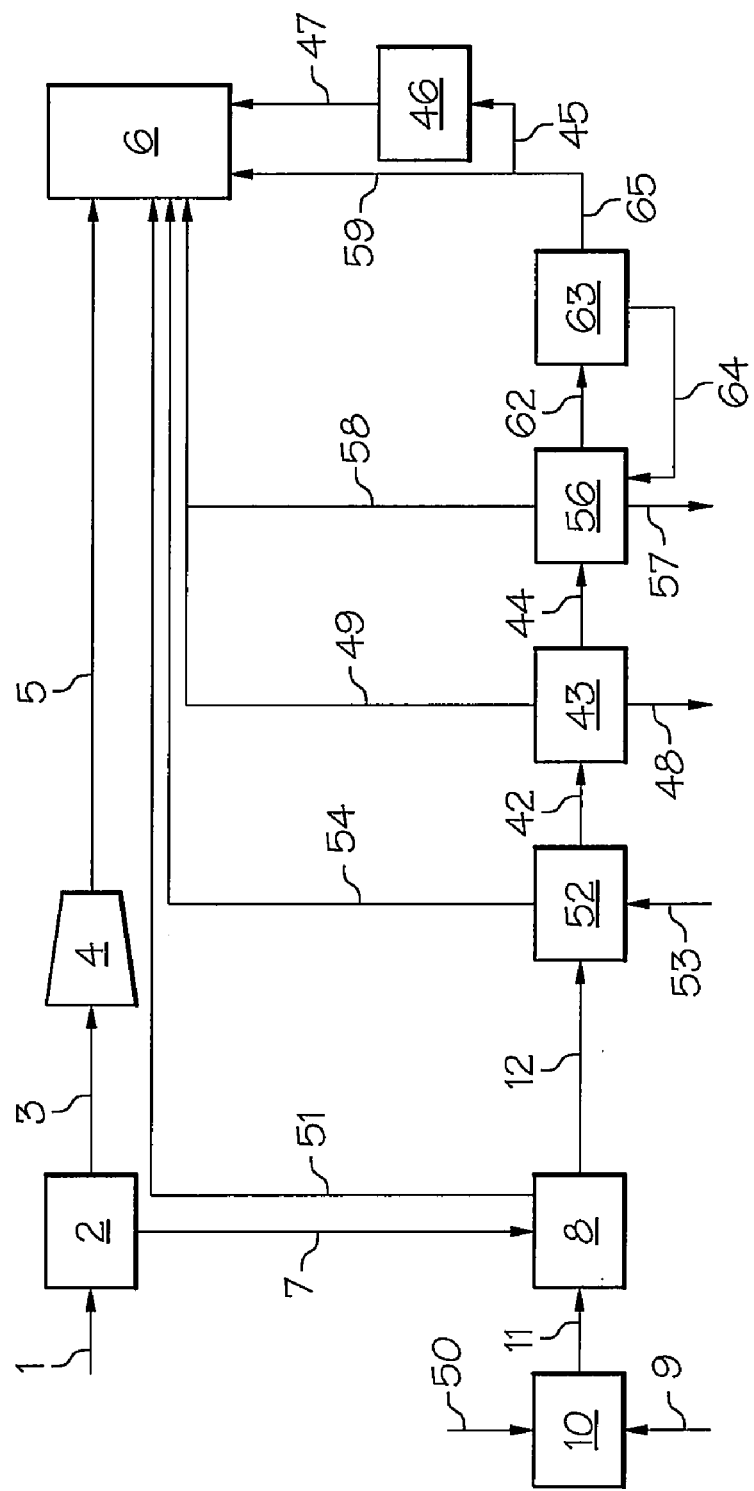
FIG. 2 shows a preferred embodiment of the present invention.

FIG. 2 illustrates a preferred embodiment of the present invention wherein the synthesis unit is a once-through Fischer-Tropsch system for synthesis of higher hydrocarbons from natural gas. Units having the same reference numbers as in FIG. 1, indicate units having the same functionality.

Natural gas from the gas inlet 9 is saturated and pre-reformed in the pre-treatment unit 10. Steam for the pre-treatment is added through a steam line 50. The pre-treated natural gas is passed from the pre-treatment unit 10 to the reformer 8, for production of syngas, through line 11. Oxygen from the air separation unit (ASU) 2 is introduced into the reformer 8 through line 7. Nitrogen from the ASU 2 is passed through line 3 to the plant for injection (EOR)$_6$.

The reformer 8 is a traditional steam methane reformer (SMR) or an autothennal reformer 5 (ATR) and may include one or more units for syngas production and/or separation of the produced syngas. Syngas produced in the reformer 8 is passed through line 12 to a syngas cool-down unit 52. All or a part of the flue gas from the reformer 8, mainly comprising $CO_2$ and $H_2O$, may be separated from the syngas and led to the EOR 6 through a line 51. The line 51 is dotted to indicate that the line 51 is not obligatory. lithe reformer 8 is a ATR unit there will be no flue gas and no line 51.

In the syngas cool-down unit 52, water is introduced through line 53 and steam is withdrawn through a line 54. The steam in line 54 may be led to the EOR for injection into the oil reservoir. If some or all of the steam in line 54 is not needed for injection, some or all of the steam in line 54 may be used for other purposes. Some of the steam may be transferred to line 50 and be introduced to the pre-treatment unit 10. Alternatively, the steam may be utilised in a not shown turbine to generate power for other uses.

The cooled-down syngas leaves the cool-down unit 52 through a line 42 and is passed through 20 a membrane unit 43 where hydrogen is separated from the syngas to give an $H_2/CO$ ratio that is useful for the further reactions.

The decant water separated from the syngas is led through line 49 to the EOR 6, and hydrogen is withdrawn through line 48 and can be used as fuel gas or for feed gas desulfurization or hydrotreating/hydrocracking of oils fractions. The syngas leaving the membrane unit 43 through a line 44 is introduced into a Fischer-Tropsch (FT) synthesis loop 56 for production for higher hydrocarbons. Higher hydrocarbons in the present description are hydrocarbon molecules having three or more carbon atoms, more preferably five or more carbon atoms.

Further background on FT synthesis may be found in WO/01/42175 to Statoil ASA, and the prior art cited therein.

Raw higher hydrocarbon product from the FT synthesis loop 56 is withdrawn through a line 57, and the produced water is withdrawn through a line 58 and passed to the EOR 6.

The remaining gas (tail gas) mainly comprising $CO_2$. lower hydrocarbons, $H_2O$, CO and some nitrogen, is withdrawn through a line 62.

The tail gas in line 62 is introduced to a tail gas treatment unit 63, in which CO is removed by a shift reaction (CO+$H_2O \rightarrow CO_2 + H_2$). The remaining tail gas is split into a hydrogen rich stream that is withdrawn through a line 64, and a hydrogen poor fraction that is withdrawn through a line 65.

The hydrogen in line 64 may be used for other reactions requiring hydrogen and/or be introduced into the Fischer-Tropsch loop 56 to adjust the H2/CO-ratio in the syngas.

The remaining tail gas, or the hydrogen-poor fraction, in line 65 may be split into two streams, one in a line 59 that is introduced to the EOR and another stream in a line 45 that is used as fuel for a power generation unit 46. The tail gas introduced into the power generation unit 46 is burned in the presence of air or oxygen-enriched air to produce power or heat. Flue gas from the power generation unit 46 is led through a line 47 to the EOR 6 for injection.

The great advantage of the present method and plant is that they allow simple and energy efficient operation of the combined plant The present invention, in its different embodiments, also makes it possible to customize the plant and respectively alter the working conditions according to the specific need and/or variations in economical and technical factors. Some advantages of using the embodiment according to FIG. 2 are listed below:

Water Injection.
Water or steam are generated several places in the GTL plant. First, it should be recognized that steam is generated at elevated pressures and temperatures. In particular, the elevated pressure will be an advantage for EOR, as work for compression to the desired injection pressure will be reduced. Often the energy content of the steam is utilized in a steam turbine to produce electricity or for heat input to process units like distillation towers, whereby the steam may be condensed to water.

Water/steam is produced (synthesized) in the FT reactor by the reaction:

Additionally some water is produced in the autothermal reformer.

In other words, water or steam is synthesized in the same amount on a molar basis as the number of —$CH_2$ units in the hydrocarbon product. This will be ca. double the amount of oxygen (mole) produced by the ASU, or half the amount of nitrogen (excluding oxygen loss to $CO_2$ in the calculation). It should also be understood that there is a significant use of boiler feed water for steam generation in an FT-plant, notably in the heat exchanger for the FT-reactors themselves and to cool down the synthesis gas. Furthermore, there is also a significant use of cooling water in an FT plant. The water generated in the FT reaction will unavoidably contain small amounts of impurities comprising alcohols, acids and other oxygenates that often will have to be removed in costly water treatment facilities before disposal. This purification may not be necessary if the water is used for EOR.

Steam Injection
As described in Example A, steam is generated in several places in the GTL plant. As such, this is a valuable product that at least partly may be used to produce electric power. Particularly in a remote location, it may be more feasible to use steam for EOR.

All in all, when water or steam is used for EOR, integration with a GTL plant can have the following benefits:
Water may not be available from other sources.
Water and/or steam is available at an elevated pressure.
Steam is available (high pressure and temperature).
Purification of the produced water is avoided.
Flue Gas Injection Flue gas may essentially come from two sources, either the exhaust gas from a gas turbine or a fired heater integrated with the GTL facility, or from application of a steam reformer (SMR) for production of synthesis gas (in this application also called waste gas). If flue gas is desirable for EOR, this may give an advantage for SMR (steam methane reforming) over other syngas technologies like ATR (autothermal reforming) or GDR (gas heated reforming). SMR may also be part of the total syngas generation option, like in combined reforming or tail gas reforming.

Injection of FT-Tail Gas.

Unless the intention of the EOR operation is simple gravity stabilization, that is, gas compression from top to bottom of the oil reservoir, it frequently is an advantage if the gas has a high miscibility with the oil. Nitrogen has low miscibility, and methane somewhat higher, whereas $CO_2$ and higher hydrocarbons (C2+) are more easily mixed with the oil It is well known that optimization of a GTL plant will comprise recycle streams, e.g. recycle of the tail gas (light off-gas) from the FT-reactor to the syngas unit or back to the FT-reactor, in order to increase overall energy and carbon efficiency. This tail gas from the FT-reactor, usually after separation of the main products (C5+) and water, then will contain $CO_2$, light hydrocarbons, and unconverted syngas. All or part of the tail gas can be used for EOR, possibly after mixing it with nitrogen, natural gas or $CO_2$ from a dedicated $CO_2$ separation unit. Now it may be a disadvantage, particularly for moderate conversion in the FT-reactor, that the tail gas contains unconverted syngas. One option therefore is to pass the gas through an additional syngas conversion unit, like a second FT-reactor, to secure high conversion before EOR Hydrogen may also be removed in a dedicated unit, for instance a polymer membrane separator, and CO converted to $CO_2$ and hydrogen in a shift reactor.

Using the Fischer-Tropsch tail gas for EOR opens up the possibility for a significant simplification and cost reduction for the GTL plant. In fact, a once-through concept might be feasible. No recycle also opens up the possibility for a simplified ASU using only enriched air for an ATR syngas generator. This enriched air may contain 25% nitrogen that will end up in the tail gas and thereby the EOR stream.

Figure 3:
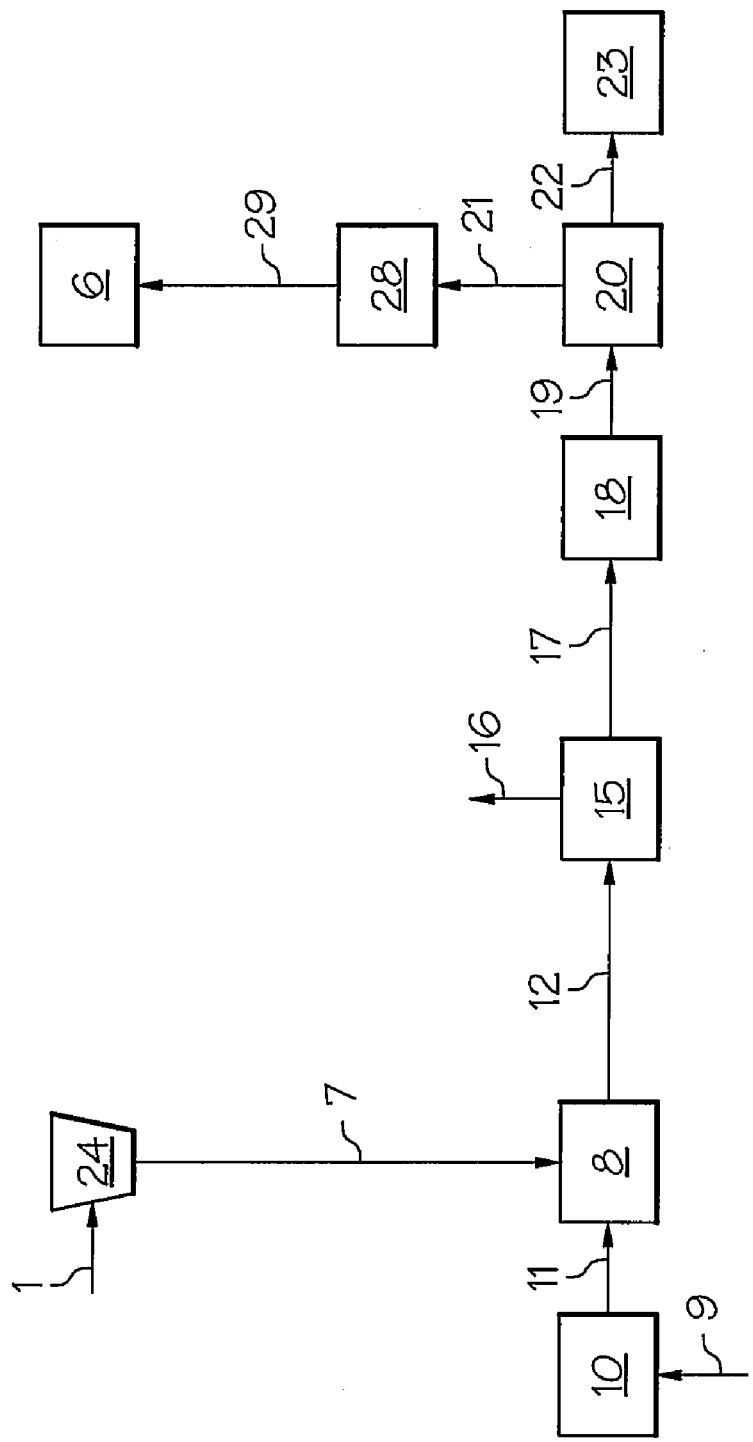
FIG. 3 shows a schematic diagram of an alternative embodiment of the present invention.

FIG. 3 illustrates an alternative embodiment of the present invention where the air that is drawn in through air intake 1 is not separated but where the air is compressed in a compression unit 24 and before it is passed through line 7 to the reformer 8. The nitrogen in the air is inert in the reactions in the plant and ends up in the tailgas that is introduced into the injection plant 6 for injection into the formation in question.

Those skilled in the art will appreciate that there may be units in the above figures for adjusting the pressure of the gases, such as compressors or reducing valves that are not shown, but which are necessary in order to match the pressures of the various units and to ensure that the streams flow in the right direction. Moreover, there may be units for heating or cooling, or heat exchangers that are not shown here, the function of which is to optimise the energy efficiency of the plant.

In must be understood that for off-shore oil or gas fields, one or all the processing units described in this application, also can be placed off-shore, like the entire GTL-plant or only the ASU or the syngas section.

EXAMPLE 1

A simulation on a plant as illustrated in FIG. 2 was performed. 367 000 Sm3/hr natural gas from line 9 was mixed with 183 t/h steam from line 50 in order to reach a steam-to-carbon ratio of 0.6. The mixture was preheated to 600° C. and fed to an. auto-thermal reformer (ATR) 8. 275 t/hr oxygen (6600 MTPD) was introduced into the ATR 8 from the line 7. The outlet temperature from the ATR 8 was 1030° C. The amount of oxygen consumed in the ATR corresponds to a co-production of $N_2$ of 39600 MTPD.

The syngas leaving the ATR 8 through line 12, which is in equilibrium and at a temperature of around 1030° C., is cooled to about 350° C. with evaporating water in the syngas cool-down unit 52 producing about 830 t/h saturated 110 bar steam that is withdrawn in line 54. The steam in line 54 may be utilized for EOR as illustrated in FIG. 4, or in turbines to generate power.

After the syngas has been cooled down 178 t/h decant water is removed and about 60 000 $Sm^3$/hr hydrogen (hydrogen purity of 90%) is separated in the membrane unit 43 before the syngas is fed to the Fischer-Tropsch loop 56. The decant water is withdrawn through line 49 and may be used for EOR. The separated hydrogen is withdrawn through line 48.

The Fischer-Tropsch loop produces 233 t/h gas that is withdrawn through line 65, 138 t/h syncrude (long paraffin chains) that is withdrawn through line 57 and 198 t/h water that is withdrawn through line 58.

The syncrude must be farther processed in a way known by the skilled. man in the art, by a not shown hydrotreater, hydrocracker and/or solvent de-waxing unit in order to give desired products (LPG, naphtha, diesel and/or lubrication oils).

The water from the Fischer-Tropsch loop that is withdrawn in line 58, contains dissolved impurities (mainly alcohols) and may be transferred to the EOR 6 and be injected into the oil field.

To maximize the amount of $CO_2$ available for recovery from the gas in line 65, the gas may be shifted with a low-temperature copper catalyst to convert about 86% of the CO into $CO_2$. A $CO_2$ recovery of 95% will then imply that 180 t/hr $CO_2$ is available for EOR purposes from the gas in line 65.

After the $CO_2$ recovery, there will still be about 830 MW heat available (LHV).

The gas compositions of some key streams are shown in Table 4.

TABLE 4

| | Composition in key process gas lines | | | | |
|---|---|---|---|---|---|
| Line | Number Description | NG Feed[9] | Syngas[12] | Hydrogen[48] | FT Feed[42] |
| | Total Stream Properties | | | | |
| Rate | KG-MOL/HR | 15521.3 | 56424.8 | 2566.3 | 43977.4 |
| | Kg/hr | 301848.2 | 761722.8 | 13377.3 | 570334.8 |

TABLE 4-continued

Composition in key process gas lines

| Line | Number Description | NG Feed[9] | Syngas[12] | Hydrogen[48] | FT Feed[42] |
|---|---|---|---|---|---|
| | Composition | | | | |
| Component Molar Rate | KG-MOL/HR | | | | |
| | H2 | 0.000 | 0.514 | 0.906 | 0.606 |
| | CO | 0.000 | 0.238 | 0.033 | 0.304 |
| | CO2 | 0.052 | 0.049 | 0.052 | 0.059 |
| | H2O | 0.000 | 0.178 | 0.006 | 0.004 |
| | N2 | 0.027 | 0.007 | 0.001 | 0.009 |
| | Methane | 0.837 | 0.013 | 0.001 | 0.017 |
| | Ethane | 0.052 | 0.000 | 0.000 | 0.000 |
| | Propane | 0.032 | 0.000 | 0.000 | 0.000 |

The invention claimed is:

1. A plant for providing gas for down-hole injection for pressure support in an oil reservoir for recovery of hydrocarbons and production of oxygenated hydrocarbons or higher hydrocarbons from natural gas, comprising:
an air separation unit for production of an oxygen-rich fraction for supply to processes that require oxygen and a nitrogen-rich fraction for injection;
a reformer for conversion of a mixture of natural gas, water and oxygen or oxygen-enriched air from the air separation unit into a synthesis gas comprising mainly $H_2$, CO, $CO_2$ and small amounts of methane in addition to any inert gas;
a synthesis unit for conversion of the synthesis gas for synthesis of higher hydrocarbons;
means for injecting gas into the reservoir;
means for transferring nitrogen from the air separation unit to the means for injecting gas;
means for transferring at least a part of a waste gas from the synthesis unit to the means for injecting gas;
means for transferring steam generated in the plant to the means for injecting gas into the reservoir; and,
a tail gas treatment unit for removing CO by a shift reaction and separation of hydrogen from the remaining tail gas.

2. The plant according to claim 1 further comprising means for transferring the remaining tail gas from the tail gas treatment unit to the means for injecting gas.

3. The plant according to claim 2, wherein the synthesis unit comprises one or more once-through Fischer-Tropsch units for synthesis of higher hydrocarbons.

4. The plant according to claim 1, wherein the synthesis unit comprises one or more once-through Fischer-Tropsch units for synthesis of higher hydrocarbons.

5. The plant according to claim 1, wherein a line is provided to transfer steam generated in reformer to the means for injecting gas.

6. A plant for providing gas for down-hole injection for pressure support in an oil reservoir for recovery of hydrocarbons and production of oxygenated hydrocarbons or higher hydrocarbons from natural gas, comprising:
an air compression unit for production of compressed air for supply to processes that require air;
a reformer for conversion of a mixture of natural gas, water and oxygen or oxygen-enriched air from the air separation unit into a synthesis gas comprising mainly $N_2$, $H_2$, CO, $CO_2$ and small amounts of methane;
a synthesis unit for conversion of the synthesis gas for synthesis of higher hydrocarbons;
means for injecting gas into the reservoir;
means for transferring nitrogen from the air separation unit to the means for injecting gas;
means for transferring at least a part of the nitrogen-rich waste gas from the synthesis unit to the means for injecting gas;
means for transferring steam generated in the plant to the means for injecting gas into the reservoir; and,
a tail gas treatment unit for removing CO by a shift reaction and separation of hydrogen from the remaining tail gas.

7. The plant according to claim 6, further comprising means for transferring the remaining tail gas from the tail gas treatment unit to the means for injecting gas.

8. The plant according to claim 7, wherein the synthesis unit comprises one or more once-through Fischer-Tropsch units for synthesis of higher hydrocarbons.

9. The plant according to claim 6, wherein the synthesis unit comprises one or more once-through Fischer-Tropsch units for synthesis of higher hydrocarbons.

10. The plant according to claim 6, wherein a steam line is provided to transfer steam generated in a syngas cool down unit to the means for injecting gas.

* * * * *